Patented Jan. 2, 1923.

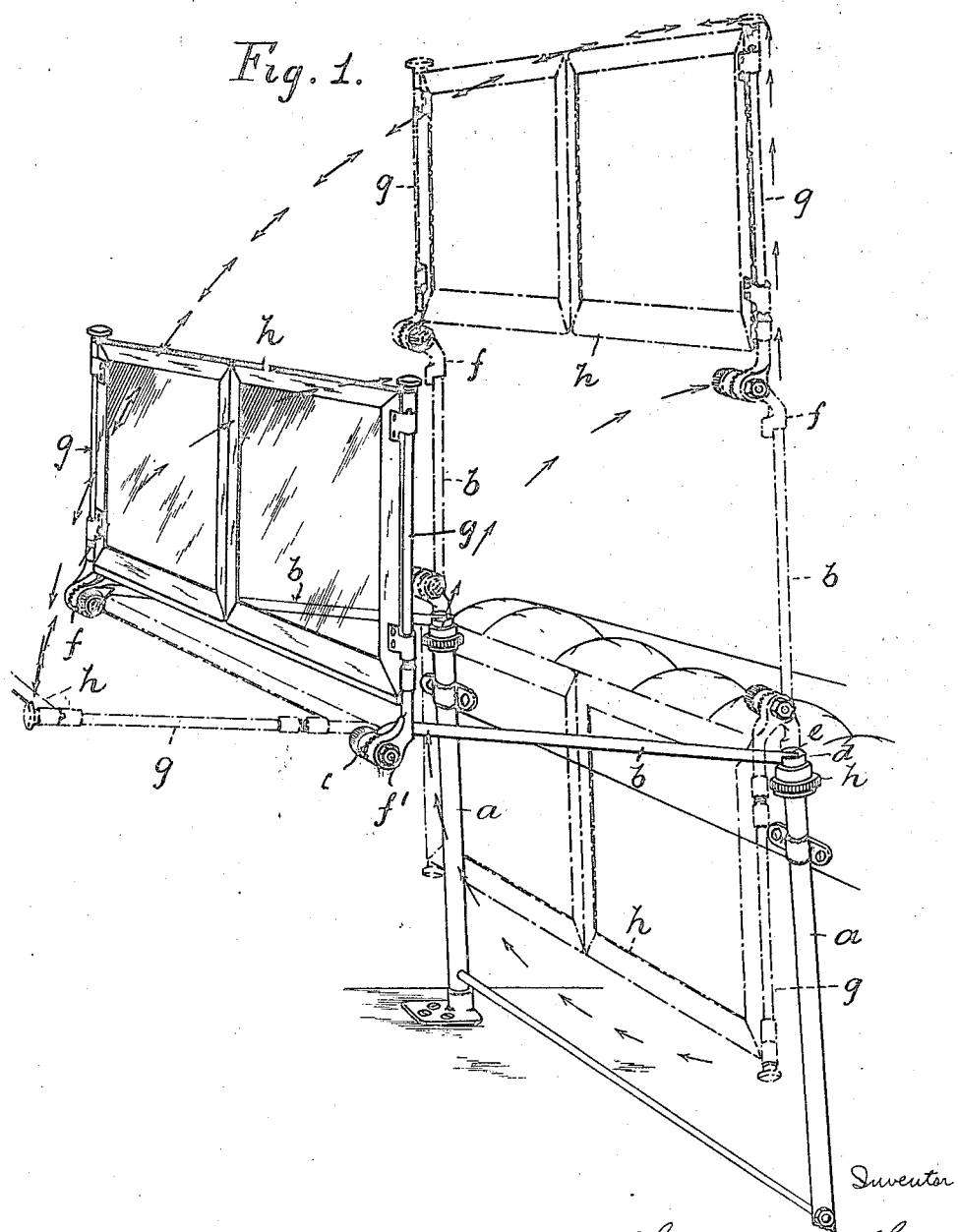

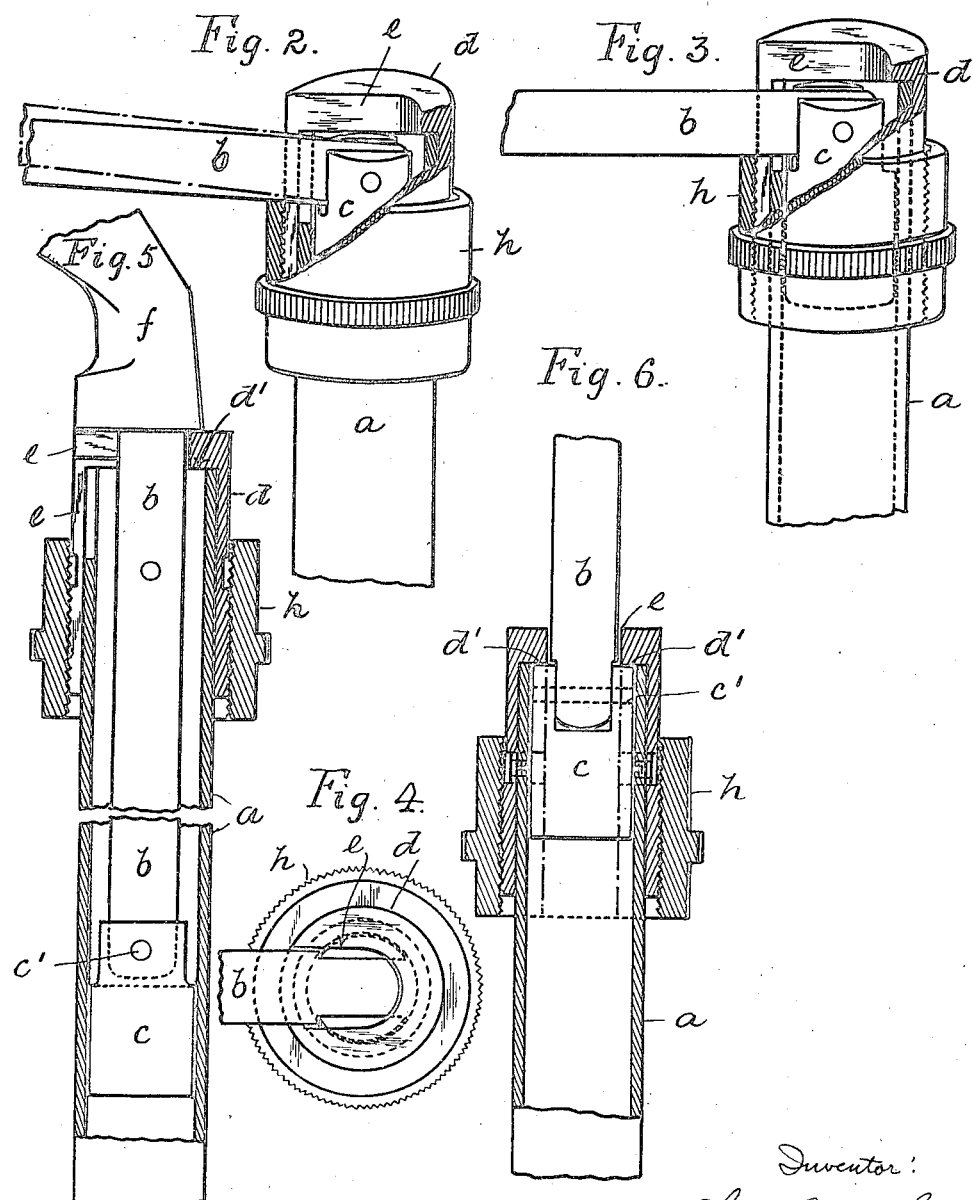

1,441,043

UNITED STATES PATENT OFFICE.

CHARLES GORDON THOMASON, OF BIRMINGHAM, ENGLAND.

WIND SCREEN FOR MOTOR VEHICLES.

Application filed June 9, 1922. Serial No. 567,139.

*To all whom it may concern:*

Be it known that CHARLES GORDON THOMASON, a subject of the King of Great Britain, residing at Acocks Green, Birmingham, England, has invented certain new and useful Improvements in Wind Screens for Motor Vehicles, of which the following is a specification.

My invention has reference to that type of rear seat wind-screens for motor-vehicles in which the screen is carried by a pair of hinged rods or bracket-members that telescope (when the screen is out of use) into sockets or tubular pillars fixed to the body of the car at the back of the driver's seat.

One object of my said invention is to provide improved screen-supporting fittings of this telescoping bracket-rod type which will permit of the said rods, on being withdrawn from the tubular pillars, to be turned rearwardly into a horizontal or approximately horizontal plane and to be there automatically but positively locked against side-play or lateral displacement in positions which permit of the screen being pivotally connected at its lower corners to the bracket rods by joints that are conveniently accessible for adjusting or altering the tilt of the said screen.

Another object of the said invention is to provide, in combination with the tubular pillar members of the screen-supporting fittings, simple but effective means whereby the height or level of the screen can be adjusted to suit the height of the rear seat or according to the requirements of the passengers occupying such seat.

The present invention consists in improved wind-screen fittings of the type referred to wherein (in order to realize the first of the above-mentioned objects) the rear sides of the fixed pillar terminals are formed with gaps or clearances, arranged in the planes of movement of the bracket-rods, and with which the corresponding bracket rods are engaged when lowered into their service positions and are thereby locked or retained against side-play or lateral movement.

The invention also consists in an improved arrangement of stops for controlling the lifting movement of the bracket rods within the pillars and also in combining with the pillar terminals, adjustable rings or collars which constitute bearers for the bracket rods when the latter are in engagement with the terminal gaps, and are adapted to be adjusted upon the said terminals in a manner which will alter the angle or slope of the bracket rods relatively to their pillars.

A rear-seat wind-screen embodying my improvements is shown in the accompanying drawings, in which Figure 1 is a perspective view showing the screen fitted behind the driver's seat of a car, and illustrating, in full and dotted lines respectively, the various position which the screen itself and its bracket rods assume both when the said screen is in use or service and when it is folded or stowed away behind the driver's seat. The figure also illustrates the manner in which the fittings are manipulated for transferring the same from the stowed-away to the service position, or vice versa.

Figures 2 and 3 illustrate, upon an enlarged scale and partly in section and partly in elevation, the terminal fittings of one of the tubular pillars and the arrangement of the complementary bracket-rod. These views show the bracket-rod in its service position and exemplify the manner in which the screen height or level can be altered by means of adjustable collars on the pillar-terminals.

Figure 4 is a plan of Figures 2 and 3.

Figure 5 is a sectional view of one of the pillars with its bracket rod fully telescoped thereunto, showing the position which the rod occupies when the screen is stowed away.

Figure 6 is a similar section to Figure 5, but shows the bracket-rod withdrawn to the full extent permitted by the internal stop-plug to which said rod is hinged; this being the position to which the rod has to be lifted before same can be turned rearwardly into its service position in engagement with the retaining gap of its pillar terminal.

The same letters of reference indicate corresponding parts in the several figures of the drawings.

The screen construction shown in the illustrated application of my invention is light in weight, simple and cheap to manufacture, and capable of being fitted to a car without involving any damage to or derangement of existing upholstery or coachwork. It also enables the screen to be easily manipulated or adjusted by the occupants of the rear seat of a car and either folded or stowed away in a small compass when not required for use, or extended or erected, with a minimum of trouble and inconvenience, into a position in which it affords maximum protection for such occupants.

The main supports of the screen structure consist of a pair of tubular or hollow standards $a$ which are capable of being fitted in upright or approximately upright positions immediately behind the driving seat of a car by stepping their lower ends into sockets which are fixed to the floor, as shown in Figure 1. The said lower ends of the pillars may be brazed or screwed into the sockets which are preferably flanged so that they can be rigidly bolted or screwed directly to the floor to enable the whole structure to be fitted without involving any disturbance or derangement of, or damage to, the upholstery or coachwork of the vehicle. These pillars may be braced together by transverse tie-rods, and when such a rod is to brace their lower or foot ends, the same may be disposed at such a height above the fixing sockets, that it can be used as a foot-rail or foot-rest. Further, if desired, for the sake of additional rigidity, brackets or the like may be used for connecting the pillars, at or near their upper ends, to the back of the driving seat or to the sides of the car-body.

In combination with such a system of tubular pillars or uprights, I propose to use, as the secondary support on which the folding screen is actually mounted, a pair of bracket-arms or rods $b$ that are adapted normally (or when the screen is in use) to be supported in horizontal and rearwardly extending positions from the upper ends of the main pillars as shown in full lines in Figure 1, whereas when the structure is collapsed or stowed away, these secondary arms are telescoped or dropped into the pillars to which they are respectively attached, in such a way that the screen itself (which is hinged to the extremities of the said arms) can be folded down to occupy a position close behind the said pillars, and close behind the back of the driving seat, as illustrated by dotted lines in Figure 1.

To provide for this action, and at the same time ensure that the secondary arms shall be firmly supported in the horizontal plane when the structure is in use, each pillar $a$ is fitted internally with a sliding block or plug $c$ and to which one end of the corresponding bracket-arm is jointed or hinged at $c'$. This arrangement admits of each plug and the corresponding bracket-arm being raised or lowered, as one unit, within the complementary pillar for bringing the joint-connection $c'$ into a position which will permit of the bracket-arm being turned rearwardly into its service position for supporting the screen in the manner illustrated by the full lines in Figure 1, whereas when it is required to stow the arm away, it is merely necessary to raise the said arm into alignment with the sliding plug when the arm-and-plug unit can be telescoped or dropped into the main pillar as shown in Figure 5.

To permit of the bracket arms hinging backwards into horizontal relationship with the fixed pillars, and for locking both arms against side play or lateral displacement, when the screen is extended, the top of the pillar is fitted with a fixed cap or terminal $d$ which is also adapted to serve as a stop (see Figure 6) for preventing the complete withdrawal of the plug-and-arm unit $b$, $c$, and the rear side of this cap (i. e., the side which is opposite the back seat of the car when the structure is erected therein) is formed with an upright gap or clearance $e$ which is open at the upper end and is of a width approximately equal to the diameter of the bracket arm. These gaps in the two pillar terminals are disposed in the planes in which the bracket-arms are adapted to make their respective angular movements on the joints $c'$, so that when the arm-and-plug units have been lifted in their pillars to positions in which the arm-joints $c'$ come above the bottoms of the clearances in the pillar-caps, the said clearances permit the arms to be turned rearwardly into the horizontal position in which they are automatically confined or locked against lateral play as shown in Figures 2, 3 and 4.

The stops for preventing the complete withdrawal of the plug-and-arm units $b$, $c$ are constituted by the shoulders $d'$ which are located inside the caps $d$, above and on either side of the gaps $e$, and are so disposed as to arrest the slides $c$ on the latter being lifted to the positions where the bracket rods can be lowered into engagement with the said gaps.

Normally the weight and levering effect of the screen is sufficient to prevent vertical displacement or oscillation of the bracket-rods within their retaining gaps $e$, but if found desirable or expedient, I may use snap or spring hinges for connecting the same with the internal plugs or slides $c$, or the said retaining clearances may be fitted with spring or elastic liners or clips adapted to grip the shanks of the bracket-rods when the latter are turned into their horizontal screen-supporting positions.

The ends of the bracket-rods remote from their connections with the sliding plugs $c$ are furnished with lugs or brackets $f$ to which are hinged at $f'$ the standard-rods $g$ that carry the actual screen $h$. These lugs are preferably so cranked or shaped that, when the bracket rods are telescoped into the fixed pillars, they (the lugs) overhang or extend rearwardly beyond the pillar-caps to admit of the standard-rods $g$ and the screen which is carried between them folding flat against the rear sides of the said main pillars. The joints $f'$ between the screen-standards and the end lugs of the bracket-rods may be of any convenient type that will provide for the adjustment of the tilt or inclination of the screen when the latter is erected and for the locking or clamping of such screen rigidly at any selected angle of use, and also in its folded or stowed-away position.

As will be seen from the perspective view of the structure, the transfer of the screen from its service position to the stowed away position is effected by first turning the screen on the joints $f'$ into the plane of the horizontal bracket-rods, when swinging the rods and screen into the vertical position indicated by dotted lines in the right-hand upper part of the figure, next lowering the bracket-rods into their respective pillars and finally folding the screen itself behind the said pillars where it is locked by tightening up the joints $f'$. The extension and erection of the screen into its service position is effected by reversing these operations.

The terminal-caps are provided with adjustable devices for determining the height or level at which the screen shall be carried in relation to the rear seat of a vehicle when the bracket-rods are withdrawn and turned rearwardly into their position of use; an advantage of such adjustment being that it enables screen fittings of one standard size to be readily adapted to suit any particular car irrespective of the height of its rear seat from the floor-level, whilst it also permits of the screen height being regulated or varied, within considerable limits, to suit a user's requirements and further provides a means for setting both supporting arms in the same plane (horizontal or otherwise) to ensure that the screen shall be carried when in use, parallel to the seat level.

The adjusting device consists of a ring or collar $h$ which is screwed or otherwise adjustably mounted on the terminal cap of each pillar $a$, in such a manner that when the corresponding bracket rod is turned rearwardly or lowered into its engagement with the rataining gap $e$, the said rod will (if the adjusting collar is set in an effective or operative position) bear or seat upon the upper edge of said collar instead of seating itself (as it would do in the absence of such adjustment) on the bottom of the retaining gap.

The point at which the bracket-rod bears upon the adjusting collar is but little removed rearwardly from the centre of the pivot $c'$, whilst the fact that the said collar is adjustable on the pillar-terminal enables its upper edge to be set into a plane which is more or less elevated from the bottom of the gap in the said terminal. Thus the collar constitutes, or is adapted to be used as, an adjustable top for varying or regulating angle or inclination at which the bracket-rod of the screen will come to rest on being lowered into its retaining gap, and thereby determining the plane or level in which the screen will be supported in relation to the rear seat of the vehicle; it being understood that when the collar is set with its bearing edge below or in the same plane as the bottom of the retaining gap (see Figure 2) the bracket-rod, on being lowered, will be supported by the terminal fitting in the horizontal or approximately horizontal position which gives the lowest level-adjustment for the screen, whereas if the stop-collar is raised to bring its bearing edge above the bottom of the terminal gap (see Figure 3) the bracket rod will be arrested at and supported by the said collar at an upward inclination (the angle of which will be determined by the setting of the collar) from the standard terminal, and will support the screen at a correspondingly higher level above the floor of the car.

Means may be combined with the stop collar for locking or retaining the same in any adjusted position in relation to floor standard or pillar, although such locking or retaining means need not be used when the collar has a screw-thread connection with the pillar-terminal (as in the illustrated example) and is adjusted by rotating the same in one direction or the other.

Having described my invention, what I claim and desire to secure by Letters Patent is:—

1. Wind-screen fittings of the telescoping bracket-rod type, wherein the rear sides of the fixed pillar terminals are formed with gaps or clearances, arranged in the planes of movement of the hinged bracket-rods, and with which the corresponding bracket rods are engaged when lowered into their service positions, for the purposes herein set forth.

2. Wind-screen fittings according to claim 1, wherein each gapped pillar-terminal embodies stops located above and on either side of the gap ($e$), and so disposed as to arrest the bracket-rod slide (*c*) on the latter being lifted to the position where the bracket-rod can be lowered into engagement with the said gap, substantially as herein described.

3. Wind-screen fittings according to claim 1, wherein the pillar-terminals are provided with adjustable collars or rings on which the bracket-rods may rest or be supported when engaged with their retaining-gaps; the said collars being adapted to serve as means for adjusting the height or level of the screen relatively to the seat substantially in the manner, and for the purposes herein set forth.

In testimony whereof I hereunto affix my signature.

CHARLES GORDON THOMASON.